(12) United States Patent
Bulzacchelli et al.

(10) Patent No.: US 8,774,228 B2
(45) Date of Patent: Jul. 8, 2014

(54) TIMING RECOVERY METHOD AND APPARATUS FOR AN INPUT/OUTPUT BUS WITH LINK REDUNDANCY

(75) Inventors: John F. Bulzacchelli, Yonkers, NY (US); Timothy O. Dickson, Danbury, CT (US); Daniel J. Friedman, Sleepy Hollow, NY (US); Yong Liu, Rye, NY (US); Sergey V. Rylov, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/157,968

(22) Filed: Jun. 10, 2011

(65) Prior Publication Data
US 2012/0314721 A1    Dec. 13, 2012

(51) Int. Cl.
*H04J 3/06*    (2006.01)
(52) U.S. Cl.
USPC .......................................................... 370/503
(58) Field of Classification Search
None
See application file for complete search history.

(56) References Cited

U.S. PATENT DOCUMENTS

| | | | |
|---|---|---|---|
| 6,606,576 | B2 | 8/2003 | Sessions |
| 7,072,355 | B2 | 7/2006 | Kizer |
| 7,415,073 | B2 | 8/2008 | Ware et al. |
| 7,516,029 | B2 | 4/2009 | Kim et al. |
| 7,602,869 | B2 | 10/2009 | Emami-Neyestanak et al. |
| 2001/0056332 | A1 | 12/2001 | Abrosimov et al. |
| 2003/0117864 | A1 | 6/2003 | Hampel et al. |
| 2005/0276261 | A1* | 12/2005 | Kim et al. ..................... 370/389 |
| 2006/0039487 | A1* | 2/2006 | Best .............................. 375/260 |
| 2006/0159113 | A1* | 7/2006 | Kizer ............................ 370/419 |
| 2007/0025483 | A1* | 2/2007 | Emami-Neyestanak et al. ............................ 375/355 |

OTHER PUBLICATIONS

Agrawal, et al., "An 8×5Gb/s Parallel Receiver with Collaborative Timing Recovery", IEEE Journal of Solid-State Circuits, vol. 44, No. 11, pp. 3120-3130, Nov. 2009.

Beukema, et al., "A 6.4-Gb/s CMOS SerDes Core with Feed-Forward and Decision-Feedback Equalization," IEEE Journal of Solid-State Circuits, vol. 40, No. 12, pp. 2633-2645, Dec. 2005.

Dang, et al., "50μm Pitch Pb-Free Micro-bumps by C4NP Technology," IEEE Electronic Components and Technology Conference, pp. 1505-1510, May 2008.

Knickerbocker, et al., "3-D silicon integration and silicon packaging technology using silicon through-vias",IEEE Journal of Solid-State Circuits , vol. 41, No. 8, pp. 1718-1725, Aug. 2006.

(Continued)

*Primary Examiner* — Ayaz Sheikh
*Assistant Examiner* — Mariela Vidal Carpio
(74) *Attorney, Agent, or Firm* — Tutunjian & Bitetto P.C.; Anne V. Dougherty (57) ABSTRACT

Methods and apparatus are provided for timing recovery for an input/output bus with link redundancy. A parallel input/output interface receiver includes a plurality of data receivers, each configured to respectively receive input data from a respective one of n+m channels, where n is an integer greater than one and m is an integer greater than or equal to one. The input data is non-calibration data for the n channels and is calibration data for the m channels. The interface receiver further includes a first phase adjustor configured to provide a first clock signal to the plurality of data receivers for sampling of only the non-calibration data at any given time, and a second phase adjustor configured to provide a second clock signal to the plurality of data receivers for sampling of only the calibration data at any given time.

23 Claims, 4 Drawing Sheets

(56) References Cited

OTHER PUBLICATIONS

Liu, et al., "A 10-Gb/s Compact, Low-Power Serial I/O with DFE-IIR Equalization in 65nm CMOS," ISSCC Dig. Tech. Papers, pp. 182-183, Feb. 2009.

O'Mahony, et al., "A 47×10Gb/s 1.4mW/(Gb/s) Parallel Interface in 45nm CMOS", IEEE International Solid-State Circuits Conference, ISSCC Dig. Tech. Papers, pp. 156-157, Feb. 2010.

Yang, et al. "A Scalable 32GB/s Parallel Data Transceiver with On-chip Timing Calibration Circuits," 2000 IEEE International Solid-State Circuits Conference (ISSCC 2000), pp. 258-259, Feb. 2000.

\* cited by examiner

TIMING RECOVERY METHOD AND APPARATUS FOR AN INPUT/OUTPUT BUS WITH LINK REDUNDANCY

GOVERNMENT RIGHTS

This invention was made with Government support under Contract No.: H98230-07-C-0409 awarded by the National Security Agency. The Government has certain rights in this invention.

BACKGROUND

1. Technical Field

The present invention generally relates to high speed data communications and, more particularly, to timing recovery for an input/output (I/O) bus with link redundancy.

2. Description of the Related Art

With advances in digital computing capabilities fueled by scaling of semiconductor technologies, demands for high-bandwidth transmission of data in systems such as servers and data communication routers continue to increase. The total aggregate input/output (I/O) bandwidth in a microprocessor for communication with devices such as a memory continues to grow. Per-pin data rates increase to keep up with these bandwidth demands, and currently exceed several Gigabit-per-second (Gb/s). The overall trend leads to a steady increase in the I/O power for microprocessors.

However, the power efficiency of these high-speed links has not scaled commensurate to the increases in aggregate bandwidth. Several factors account for this degradation in power efficiency. First and foremost, frequency-dependent losses in the communication channels do not improve as the data rate increases. This requires more sophisticated I/O circuit architectures, including the introduction of equalizers in the transmitter (TX) and/or receiver (RX), to compensate for intersymbol interference (ISI) introduced by limited-bandwidth channels. Moreover, the decrease in the bit unit interval (UI) places more stringent timing requirements in the I/O circuitry. At multi-Gb/s data rates, adjustments in the phase of the sampling clock typically must be made with a resolution on the order of picoseconds. This ensures that the incoming data is sampled close to the time within the bit interval where the voltage margin reaches a maximum. The phase adjustment can be achieved through the use of programmable phase interpolators, delay lines, and delay-locked loops, among others. Once the clock is properly aligned or synchronized to the incoming data, one or more edges of the clock can be used to sample incoming data.

In source synchronous I/O architectures, a data source (or transmitter) broadcasts a clock signal on a separate channel along with multiple bits (or a bus) of data. This technique alleviates the need for a high-bandwidth clock recovery loop, since timing jitter on the incoming data is correlated to timing jitter on the forwarded clock. At multi-Gb/s data rates, the received clock signal must be aligned to each data bit such that all bit receivers in the bus optimally sample the incoming data.

It is often desirable to have the capability to sweep the phase of the sampling clock relative to the data in order to perform link diagnostics such as mapping eye contours or measuring timing margins. This could be required to facilitate automated link maintenance to adjust for voltage or temperature drifts, or if receiver-side equalization is employed, as the ability to sweep the sampling clock phase may be required for certain equalizer adaptation algorithms. It is preferable to do so in a manner that does not interfere with the receiving and recovery of incoming data. Therefore, it is common to find a secondary data bit receiver for link diagnostics placed in parallel with the primary bit receiver such that uninterrupted data transmission can occur while still allowing for link diagnostics. In such an architecture, two phase alignment mechanisms are required. The first provides an adjustable clock phase to the primary data receiver and might not be adjusted during diagnostics. The second provides an adjustable clock phase to the secondary data receiver, and is free to be adjusted during link diagnostics with no impact on the phase of the sampling clock for the primary data receiver. This comes at the expense of receiver power and area, since the complexity of each bit receiver has roughly doubled.

Complexity in the bit receiver can be reduced if redundant data links are employed as described in the prior art. Using link redundancy, at least N+1 data links are required to transmit and receive N-bits of data while still allowing one of the N+1 links to be calibrated or otherwise adjusted at a given time. This permits continuous and uninterrupted data transmission of the N bits. Links can be taken out-of-service periodically, and the data that was being carried over that link can be transmitted over the redundant link. While out-of-service, known training or calibration patterns or data can be transmitted and received over the link to facilitate any link calibration or maintenance algorithms. If managed appropriately, each link in the N+1 bit bus can be calibrated periodically in a round-robin fashion. While a link is being calibrated or adjusted, the phase of the sampling clock to this link can be adjusted as needed for diagnostic purposes without disturbing the N-bits of data being transmitted on other links in the bus. Link redundancy reduces hardware overhead, since secondary data receivers are not needed for each bit but rather one extra receiver is needed per N links. This comes at the expense of extra physical connections (channels) between the data transmitter and data receiver.

SUMMARY

According to an aspect of the present principles, there is provided a parallel input/output interface receiver. The interface receiver includes a plurality of data receivers, each configured to respectively receive input data from a respective one of n+m channels. The input data is non-calibration data for the n channels of the n+m channels and is calibration data for the m channels of the n+m channels. The interface receiver further includes a first phase adjustor configured to provide a first clock signal to the plurality of data receivers for sampling of only the non-calibration data at any given time, and a second phase adjustor configured to provide a second clock signal to the plurality of data receivers for sampling of only the calibration data at any given time. Also, n is an integer greater than one and m is an integer greater than or equal to one.

According to another aspect of the present principles, there is provided a method for timing recovery in a parallel input/output interface receiver. The method includes receiving input data from a respective one of n+m channels by each of a plurality of data receivers. The input data is non-calibration data for the n channels of the n+m channels and is calibration data for the m channels of the n+m channels. The method further includes using a first phase adjustor to provide a first clock signal to the plurality of data receivers for sampling of only the non-calibration data at any given time, and using a second phase adjustor to provide a second clock signal to the plurality of data receivers for sampling of only the calibration data at any given time. Also, n is an integer greater than one and m is an integer greater than or equal to one.

According to yet another aspect of the present principles, there is provided a parallel input/output interface receiver. The interface receiver includes a plurality of data receivers, each having a respective data sampler and a respective multiplexer. The data sampler has a data input and a clock input. The data input is configured to receive input data from a respective one of a plurality of channels. The clock input is configured to receive a clock signal from the respective multiplexer. The input data includes non-calibration data and calibration data. The interface receiver further includes a first phase adjustor configured to provide a first clock signal to the multiplexer of the plurality of data receivers for sampling of only the non-calibration data, and a second phase adjustor configured to provide a second clock signal to the multiplexer of the plurality of data receivers for sampling of only the calibration data. Responsive to a completion of a calibration process for at least a minimum number of the plurality of data receivers, the first phase adjustor is reconfigured to provide the first clock signal to the multiplexer of the plurality of data receivers for only the calibration data at any given time, and the second phase adjustor is reconfigured to provide the second clock signal to the multiplexer of the plurality of data receivers for only the non-calibration data at any given time According to still another aspect of the present principles, there is provided a method for timing recovery in a parallel input/output interface receiver. The method includes receiving input data from a respective one of a plurality of channels by a respective data sampler included in each of a plurality of data receivers. Each of the plurality of data receivers further includes a respective multiplexer for providing a clock signal to the respective data sampler. The input data includes non-calibration data and calibration data. The method further includes configuring a first phase adjustor to provide a first clock signal to the multiplexer of the plurality of data receivers for sampling of only the non-calibration data, and configuring a second phase adjustor to provide a second clock signal to the multiplexer of the plurality of data receivers for sampling of only the calibration data. Responsive to a completion of a calibration process for at least a minimum number of the plurality of data receivers, the method further comprises reconfiguring the first phase adjustor to provide the first clock signal to the multiplexer of the plurality of data receivers for only the calibration data at any given time, and reconfiguring the second phase adjustor to provide the second clock signal to the multiplexer of the plurality of data receivers for only the non-calibration data at any given time These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As noted above, the present principles are directed to timing recovery for an input/output (I/O) bus with link redundancy. Implementations of the present principles are particularly suited for use in high-speed parallel interfaces. The present principles use two phase adjustment elements to service a receiver for an (N+M)-wide parallel bus with link redundancy. Thus, the present principles advantageously provide for a parallel bus capable of receiving N bits of data from N lanes while calibrating M lanes at any given time. Nonetheless, for the sake of illustration and simplicity, we set M=1, and thereafter refer to the bus as an (N+1)-wide parallel bus with link redundancy. However, values of M greater than 1 may be readily used in accordance with the present principles, while maintaining the spirit of the present principles. The clock sampling phase for N receivers processing active data is provided by a first phase adjustment element, while the redundant link used for link calibration and maintenance is serviced by a second phase adjustment element. This provides the capability of continuously adjusting the sampling clock phase during receiver calibration without disturbing the phase of the clock used to sample active data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
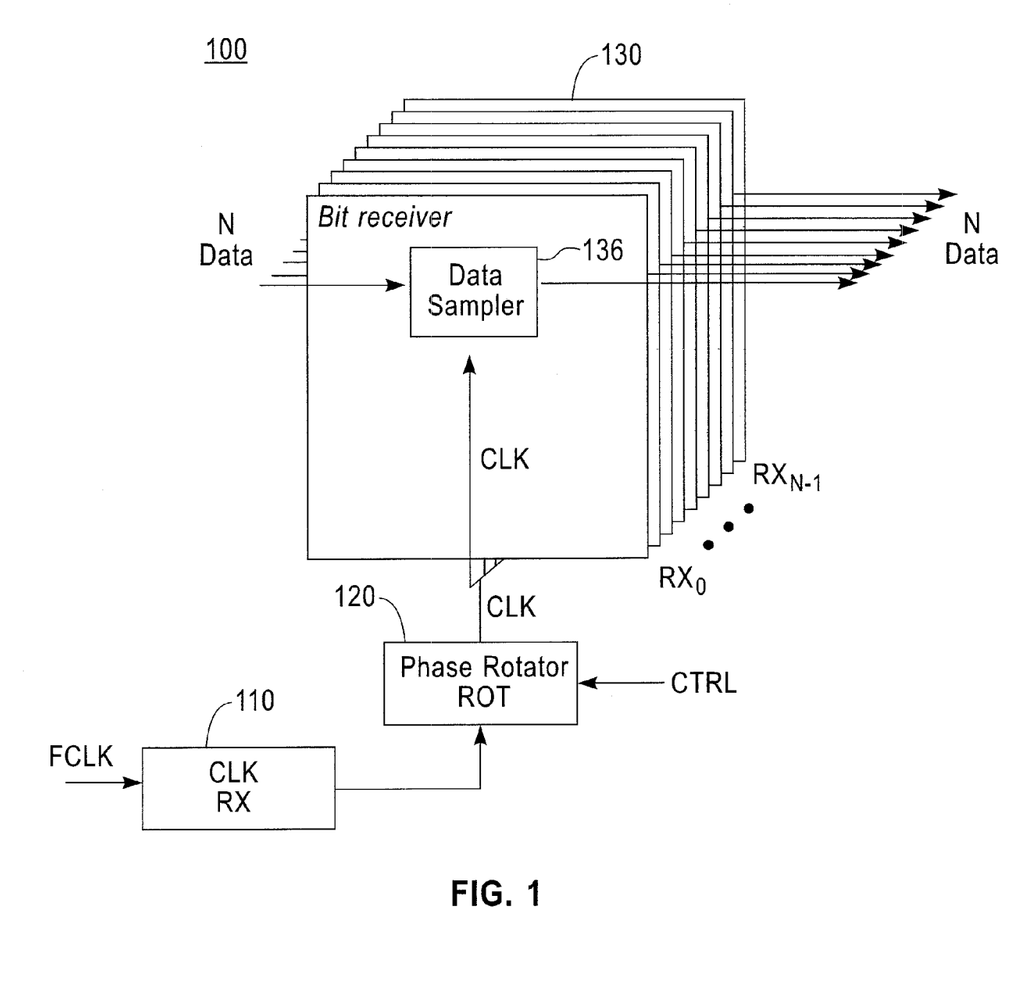
FIG. 1 is a block diagram showing a source-synchronous parallel input/output (I/O) interface receiver 100 with timing recovery accomplished using a single phase adjustment element, in accordance with the prior art.

In multi-bit high-speed I/O buses where the skew between channels is small relative to 1 unit interval (UI), timing information from multiple channels can be used to update the phase of a global sampling clock. This permits the use of a single clock phase adjustment element which can be shared over an N-bit bus. Doing so improves the overall power efficiency of the link, since the power of the single phase adjustment element is amortized over the width of the bus. Such techniques have been applied to serial receivers for both embedded-clock architectures as well as source-synchronous architectures. The concept for this prior art architecture is depicted in FIG. 1, for the case of a source-synchronous bus. That is, FIG. 1 is a diagram showing a source-synchronous parallel input/output (I/O) interface receiver 100 with phase recovery accomplished using a single phase adjustment element, in accordance with the prior art. The forwarded clock (FCLK) is received by a clock receiver (CLK RX) 110 which could include a clean-up or multiplying PLL (not shown). After the clock receiver 110, the clock signal is sent to a phase-adjustment element. In the embodiment of FIG. 1, the phase-adjustment element is a phase rotator 120. However, as recognized by one of ordinary skill in the art, other devices and/or techniques including adjustable delay lines could be used. This phase rotator 120 has a single control mechanism (CTRL), possibly a digital input code or an analog control voltage depending on the implementation of the phase rotator 120. The clock output from the phase rotator 120 is then fed to all N bit receivers 130 in the bus, preferably through a low-skew clock distribution network (not shown). In particular, the output from the phase rotator 120 is fed to the data sampler 136 within each of the N bit receivers 130. Note that it is understood that this clock output does not necessarily involve a single clock phase. For example, differential clock phases could be generated. Alternatively, a 90° clock phase could also be distributed from the phase rotator. Multiple clock phases required for quarter-rate or eighth-rate receivers could be derived from the single phase adjuster, but the key to the prior art approach depicted in FIG. 1 is that a single phase adjustment mechanism 120 adjusts all clock phases sent to all N bit receivers 130 in concert. The output of the N bit receivers 130 may include information about the recovered data as well as phase information to be used in a global timing recovery algorithm to set the control input of the phase rotator 120.

The use of a single sampling phase adjuster for all bit receivers in a bus has drawbacks, particularly if link diagnostics are considered. For example, the sampling phase cannot be adjusted arbitrarily while data is being received, as bit errors could occur. In bit receivers employing receive-side equalization, the equalizer adaptation algorithms may require the capability to adjust or sweep a clock. However, such capability is not possible in prior-art bus architectures employing a single clock phase adjustment element.

Figure 2:
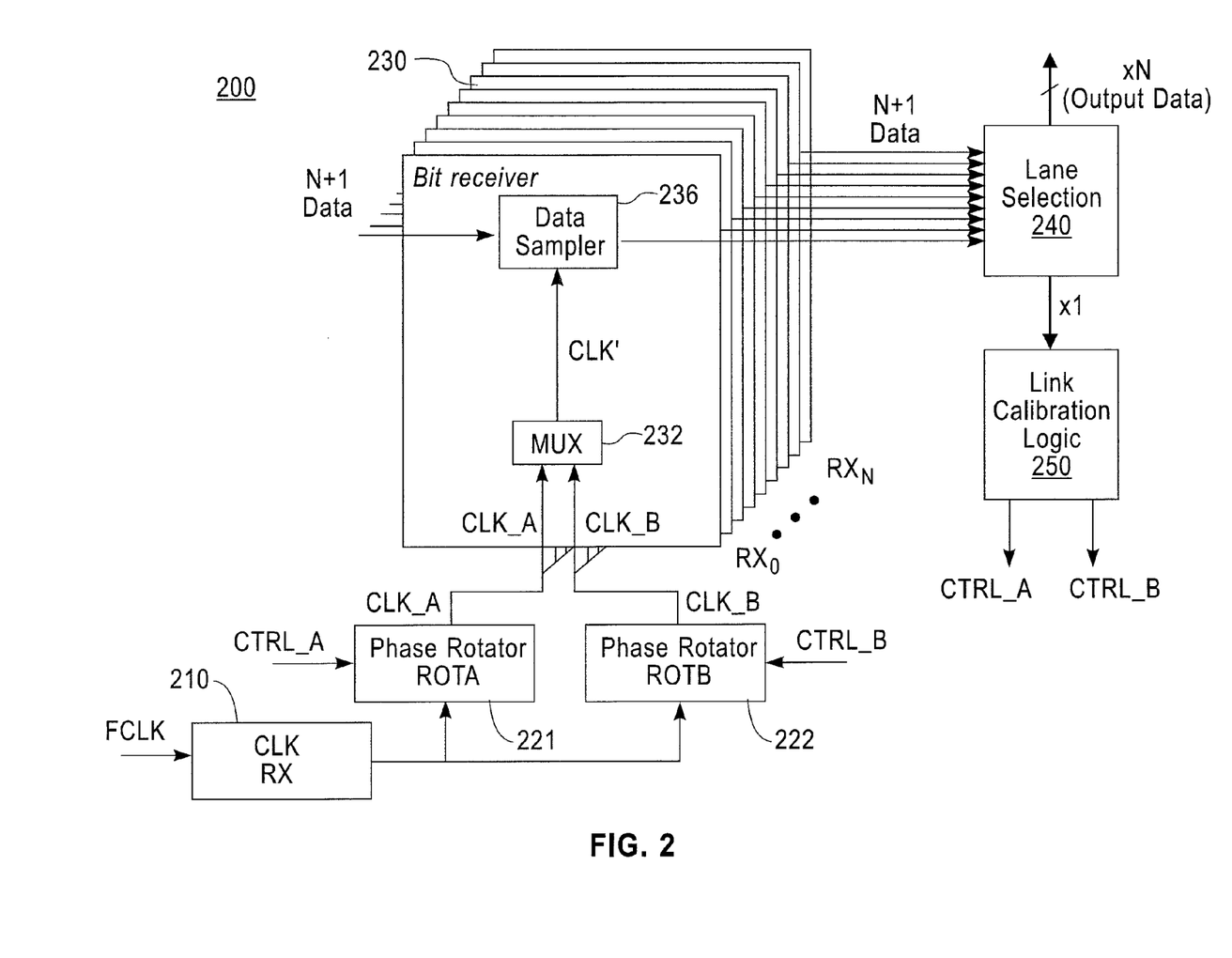
FIG. 2 is a block diagram showing a source-synchronous parallel I/O interface receiver 200, in accordance with an embodiment of the present principles.

FIG. 2 shows a source-synchronous parallel I/O interface receiver 200, in accordance with an embodiment of the present principles. The interface receiver 200 uses two phase rotators 221, 222 to accomplish single-phase timing recovery for a parallel I/O interface receiver while allowing for phase adjustment on one or more bit receivers without disturbing the clock applied to N bit receivers processing customer data.

The interface receiver 200 uses at least N+1 data (or bit) receivers 230 (also individually designed by the reference characters $RX_0$ through $RX_N$) to recover N bits of data ("customer data") being transmitted over N+1 channels. The extra channel or lane is used to enable periodic calibration or maintenance of any lane. We explicitly note that the terms "channel" and "lane" are used interchangeably herein. While the embodiment depicted in FIG. 2 employs one extra lane, the present principles could be extended to any number of redundant lanes (i.e., N+2, N+3, and so forth) by one skilled in the art. The data sent over the extra lane or lanes could be a known training pattern to facilitate the calibration or maintenance of this bit receiver. The present principles provide a method for sharing phase adjustment elements across a bus while still supporting the capability to adjust or sweep the phase of the clock being applied to the particular bit receiver under calibration.

A forwarded clock FCLK is received by a clock receiver (CLK RX) 210 which could include a clean-up or multiplying PLL (not shown). After the clock receiver 210, the clock signal is sent to two phase-adjustment elements, shown in FIG. 2 as phase rotator ROTA 221 and phase rotator ROTB 222. These phase rotators 221, 222 have an adjustable range sufficient to cover one unit interval with respect to the input data and are controlled independently by control signals CTRL_A and CTRL_B, respectively. Again it is understood that each phase rotator 221, 222 or phase adjustment element could produce more than one phase, such as multiple clock phases required for a half-rate or quarter-rate bit receiver, or a 90° clock phase or phases required for data edge samples.

An aim of the present principles is that one phase rotator 221 is used to provide a clock phase (either CLK_A or CLK_B) to the N data receivers operating on customer data, while the other phase rotator 222 provides the other clock phase (either CLK_B or CLK_A, respectively), depending on which clock signal is assigned to service customer data), to the particular one of the receivers 230 being calibrated. The control to the second phase rotator 222 is free to adjust the clock phase at the output of that rotator 222 during the calibration of the particular one of the receivers 230. This allows for sweeping of the data eye horizontal boundaries for the particular receiver 230 being calibrated without perturbing the phase of the clock used to sample customer data on the other N data receivers 230. Within each bit receiver 230, a MUX 232 selects which clock signal is appropriate for that receiver 230 depending on whether that receiver 230 is processing customer data or calibration data (the latter being data that is used for the purpose of calibration and/or maintenance and/or diagnostic evaluation of a receiver and/or channel, which could include, but is not limited to, a known training pattern such as a pseudo-random binary sequence and so forth). Customer data is also interchangeably referred to herein as non-calibration data. An output of the MUX 232 is provided to a data sampler 236 for sampling the N+1 data received by the N+1 receivers 230. The N+1 data outputs from the N+1 bit receivers 230 are fed to a lane selector 240 which determines which N data are customer data, and which N data includes information required to perform calibration or maintenance on a single lane. The latter (calibration or maintenance information) is passed to a logic subsystem, also referred to as link calibration logic 250, which runs algorithms required for link calibration or maintenance. Among the outputs produced by the link calibration logic 250 are the control signals CTRL_A and CTRL_B for phase rotators ROTA and ROTB, respectively. The lane selector 240 and the link calibration logic 250 can operate in the same clock domain as the bit receivers 230, or in a separate logic clock domain. This choice has specific design implications that can be assessed by one skilled in the art, but does not have implications on the spirit of the present principles.

A possible routine for performing a bus-level calibration is described as follows. At the beginning of bus calibration, ROTA and its associated output CLK_A are designated to service customer data, while ROTB and its associated output CLK_B are designated to service a link to be calibrated. Also at the beginning of bus calibration, the link connected to the first receiver in the bus ($RX_0$ as denoted in FIG. 2) is switched from transmitting customer data to calibration data. The clock selection MUX 232 in $RX_0$ switches the clock input to receiver $RX_0$ from CLK_A to CLK_B such that $RX_0$ can begin its calibration. This calibration includes phase recovery for proper clock/data alignment. It could also include calibration of equalizer settings and offset compensation, among other things, depending on the implementation of the bit receiver. Of course, calibration is not limited to solely the preceding described items and, thus, other items as would be readily contemplated by one of ordinary skill in the art may also be subjected to calibration in accordance with the teachings of the present principles. After calibration of this receiver $RX_0$, information about the optimal phase setting for this receiver $RX_0$ is obtained and stored in a logic register within the link calibration logic 250. $RX_0$ is put back in service to process customer data, and its clock input is switched back to CLK_A. All of the other receivers $RX_1$ through $RX_N$ are sequentially calibrated in the same fashion as $RX_0$. After calibrating all of the receivers 230 in the bus, the optimal sampling clock phase for the bus is determined based on stored information about the optimal sampling clock phase for each bit receiver 230. At this point, the roles of ROTA and ROTB are swapped such that ROTB and CLK_B service receivers processing customer data, while ROTA and CLK_A service receivers being calibrated. After swapping the roles of the rotators, another calibration cycle begins. This "ping-pong" action of swapping the roles of two phase rotators has previously been used for a single bit receiver in a particular prior art approach. However, the present principles show a hardware-efficient extension of the idea for use in an entire bus that includes multiple receivers. Application of the concept in the aforementioned particular prior art approach to an entire bus of width N would require 2*N phase rotators, while the technique according to the present principles requires only two phase rotators. We note that while the preceding example implements the "ping-pong" action responsive to all of the bit receivers being calibrated (i.e., a full pass), in other embodiments, less than all of the receivers (e.g., a predetermined subset) may be calibrated before the "ping-pong" action is initiated.

Figure 3:
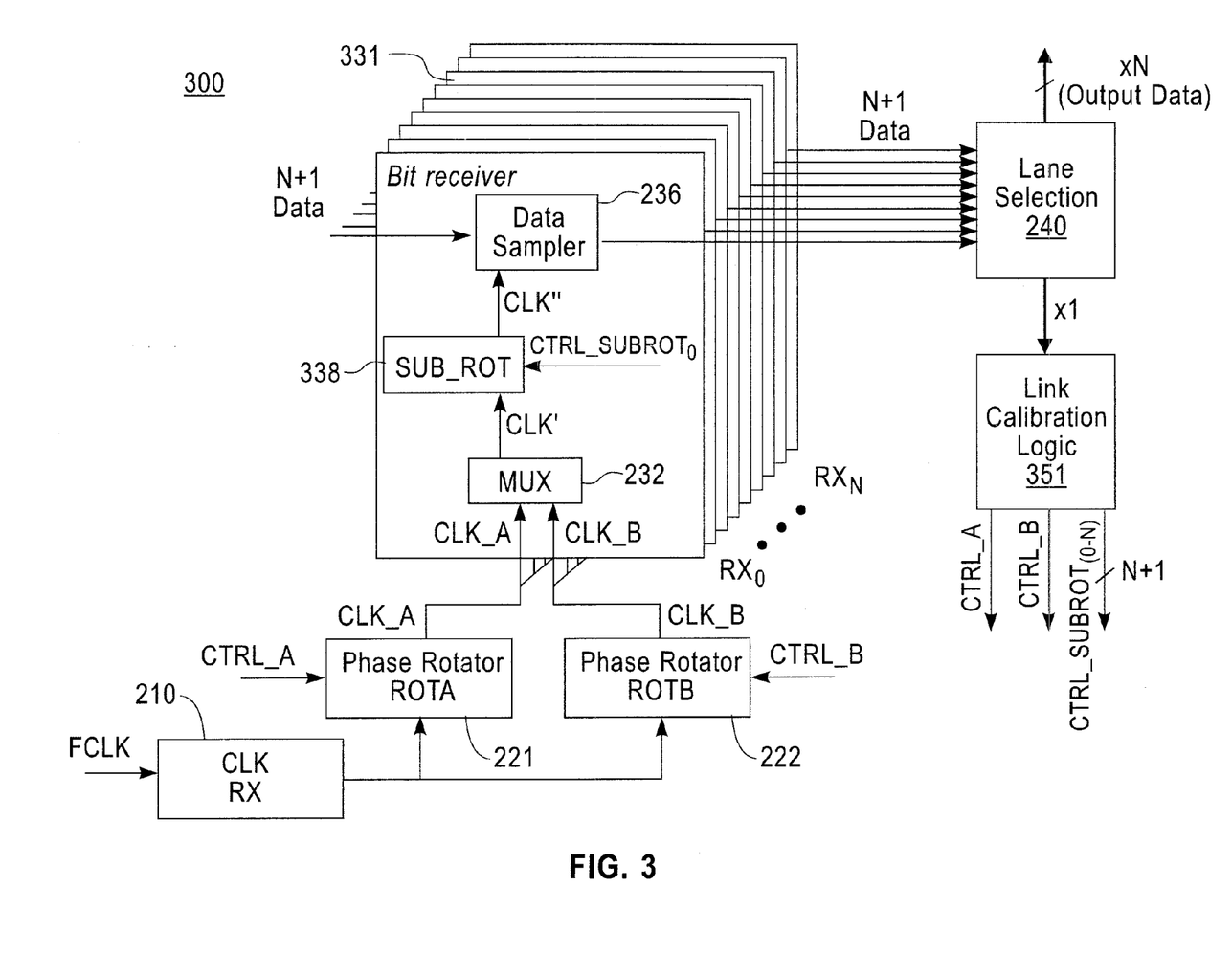
FIG. 3 is a block diagram showing another source-synchronous parallel I/O interface receiver 300, in accordance with an embodiment of the present principles.

FIG. 3 shows another source-synchronous parallel I/O interface receiver 300, in accordance with an embodiment of the present principles. In the parallel interface receiver 300, some amount of phase adjustment is allocated within each bit receiver to permit for static or dynamic skew compensation. The interface receiver 300 of FIG. 3 differs from the interface receiver 200 of FIG. 2 by inserting an adjustable delay element SUB_ROT 338 within each receiver. The phase rotators ROTA 221 and ROTB 222 serve the same purpose as the embodiment of FIG. 2, and again can adjust the clock phase with a range sufficient to cover at least one unit interval with respect to the input data. The adjustable delay element SUB_ROT 338 has an adjustable range less than one unit interval to compensate for a small amount of skew. The hardware efficiency of this approach diminishes as the range of phase adjustment it can cover grows, assuming the power and circuit area of SUB_ROT 338 grows with the range of delays it can cover. The SUB_ROT element in a given bit receiver RN is controlled by an independent signal $CTRL\_SUBROT_j$, where j can range from 0 to N for a bus with width of N+1.

Figure 4:
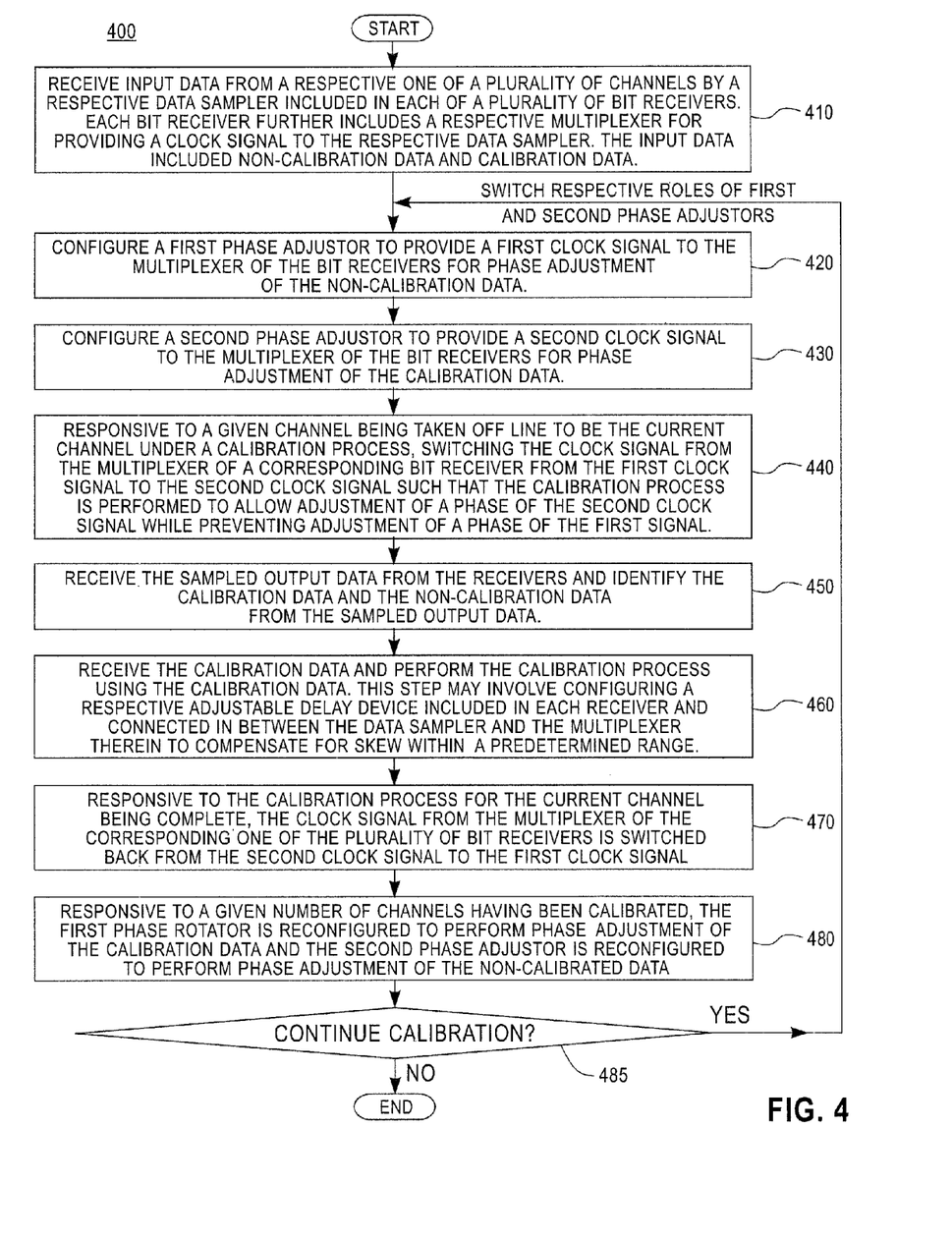
FIG. 4 is a flow diagram showing a method 400 of timing recovery for a parallel input/output interface receiver with link redundancy, in accordance with an embodiment of the present principles.

FIG. 4 shows a method 400 of timing recovery for an input/output interface receiver with link redundancy, in accordance with an embodiment of the present principles. We note that steps 440, 450, and 460 collectively correspond to the calibration process described with respect to method 400.

At step 410, input data from a respective one of a plurality of channels is received by a respective data sampler included in each of a plurality of bit receivers. Each of the plurality of bit receivers further has a respective multiplexer for providing a clock signal to the respective data sampler. The input data includes non-calibration data and calibration data.

At step 420, a first phase adjustor is configured to provide a first clock signal to the multiplexer of the plurality of bit receivers for phase adjustment of the non-calibration data.

At step 430, a second phase adjustor is configured to provide a second clock signal to the multiplexer of the plurality of bit receivers for phase adjustment of the calibration data.

At step 440, responsive to a given one of the plurality of channels being taken off line to be the current channel under the calibration process, the clock signal from the multiplexer of a corresponding one (i.e., the bit receiver to which corresponds the given one of the channels) of the plurality of bit receivers is switched from the first clock signal is switched to the second clock signal such that the calibration process is performed to allow adjustment of a phase of the second clock signal while preventing adjustment of a phase of the first clock signal.

At step 450, a channel selector receives the sampled output data from the plurality of bit receivers and identifies at least one of the calibration data and the non-calibration data from the sampled output data.

At step 460, a link calibrator receives the calibration data from the channel selector and performs the calibration process using the calibration data. Step 460 may involve configuring a respective adjustable delay device included in each of the plurality of bit receivers and connected in between the data sampler and the multiplexer therein to compensate for skew within a predetermined range. The link calibrator generates a first control signal (CTRL_A) for the first phase adjustor, a second control signal (CTRL_B) for the second phase adjustor, and a third control signal ($CTRL\_SUBROT_{(0-N)}$) for the adjustable delay device.

At step 470, responsive to the calibration process for the current channel being complete, the clock signal from the multiplexer of the corresponding one of the plurality of bit receivers is switched back from the second clock signal to the first clock signal.

At step 480, responsive to a given number of the plurality of channels having been calibrated (e.g., a pass through all of the channels), the first phase adjustor is reconfigured to provide the first clock signal for sampling phase adjustment of the calibration data and the second phase adjustor is reconfigured to provide the second clock signal for sampling phase adjustment of the non-calibration data.

At step 485, it is determined whether or not to continue calibration. If not, then the method is terminated. However, if so, then the method 400 returns to step 420, so as to continue the method, but now with the roles of the first phase adjustor and the second phase adjustor being switched such that the first phase adjustor now processes the calibration data (e.g., at step 420, etc.) while the second phase adjustor processes the non-calibration data (e.g., at step 430, etc.). In this way, a ping-pong action is obtained between the roles of the two phase adjustors.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A parallel input/output interface receiver, comprising:
   a plurality of data receivers, each configured to respectively receive input data from a respective one of n+m channels, the input data being non-calibration data for the n channels of the n+m channels and calibration data for the m channels of the n+m channels;
   a first phase adjustor configured to provide a first clock signal to the plurality of data receivers for sampling of only the non-calibration data at any given time; and
   a second phase adjustor configured to provide a second clock signal to the plurality of data receivers for sampling of only the calibration data at any given time,
   wherein n is an integer greater than one, m is an integer greater than or equal to one, and a phase of the first clock signal provided by the first phase adjustor is prevented from being adjusted while a phase of the second clock signal provided by the second phase adjustor is permitted to be adjusted during a calibration process.

2. The parallel input/output interface receiver of claim 1, wherein responsive to a completion of the calibration process for at least a minimum number of the plurality of data receivers, the first phase adjustor is reconfigured to provide the first clock signal to the plurality of data receivers for sampling of only the calibration data at any given time, and the second phase adjustor is reconfigured to provide the second clock signal to the plurality of data receivers for sampling of only the non-calibration data at any given time.

3. The parallel input/output interface receiver of claim 2, wherein the minimum number is limited to being determined from a single pass.

4. The parallel input/output interface receiver of claim 1, wherein each of the plurality of data receivers comprises a respective data sampler and a respective multiplexer, the respective data sampler having a data input and a clock input, the data input configured to receive the input data from the respective one of the n+m channels, the clock input configured to receive a clock signal from the respective multiplexer, the respective multiplexer having a first input and a second input for respectively receiving the first clock signal and the second clock signal from the first phase adjustor and the second phase adjustor, respectively.

5. The parallel input/output interface receiver of claim 1, further comprising a channel selector configured to receive output data from the plurality of data receivers and to identify the calibration data and the non-calibration data from the output data.

6. The parallel input/output interface receiver of claim 5, further comprising a link calibrator configured to receive the calibration data from the channel selector and to perform the calibration process using the calibration data.

7. The parallel input/output interface receiver of claim 6, wherein the link calibrator is further configured to generate a first control signal for controlling the first phase adjustor and a second control signal for controlling the second phase adjustor.

8. The parallel input/output interface receiver of claim 6, wherein the link calibrator comprises a storage medium for storing the calibration data and information derived there from.

9. The parallel input/output interface receiver of claim 1, wherein each of the plurality of data receivers further comprises a respective adjustable delay device for compensating for skew within a predetermined range.

10. A method for timing recovery in a parallel input/output interface receiver, comprising:
  receiving input data from a respective one of n+m channels by each of a plurality of data receivers, the input data being non-calibration data for the n channels of the n+m channels and calibration data for the m channels of the n+m channels;
  using a first phase adjustor to provide a first clock signal to the plurality of data receivers for sampling of only the non-calibration data at any given time;
  using a second phase adjustor to provide a second clock signal to the plurality of data receivers for sampling of only the calibration data at any given time; and
  preventing a phase of the first clock signal provided by the first phase adjustor from being adjusted while permitting a phase of the second clock signal provided by the second phase adjustor to be adjusted during a calibration process,
  wherein n is an integer greater than one and m is an integer greater than or equal to one.

11. The method of claim 10, further comprising, responsive to a completion of the calibration process for at least a minimum number of the plurality of data receivers, reconfiguring the first phase adjustor to provide the first clock signal to the plurality of data receivers for only the calibration data at any given time, and reconfiguring the second phase adjustor to provide the second clock signal to the plurality of data receivers for only the non-calibration data at any given time.

12. The method of claim 11, wherein the minimum number is limited to being determined from a single pass.

13. The method of claim 10, wherein each of the plurality of data receivers comprises a respective data sampler and a respective multiplexer, the respective data sampler having a data input and a clock input, the data input configured to receive the input data from the respective one of the n+m channels, the clock input configured to receive a clock signal from the respective multiplexer, the respective multiplexer having a first input and a second input for respectively receiving the first clock signal and the second clock signal from the first phase adjustor and the second phase adjustor, respectively.

14. The method of claim 10, further comprising configuring a channel selector to receive output data from the plurality of data receivers and to identify the calibration data and the non-calibration data from the output data.

15. The method of claim 14, further comprising configuring a link calibrator to receive the calibration data from the channel selector and to perform the calibration process using the calibration data.

16. The method of claim 15, further comprising configuring the link calibrator to generate a first control signal for controlling the first phase adjustor and a second control signal for controlling the second phase adjustor.

17. The method of claim 10, further comprising configuring a respective adjustable delay device in each of the plurality of data receivers to compensate for skew within a predetermined range.

18. A computer program product comprising a non-transitory computer readable storage medium including a computer readable program, wherein the computer readable program when executed on a computer causes the computer to perform the method steps as recited in claim 10.

19. A parallel input/output interface receiver, comprising:
  a plurality of data receivers, each having a respective data sampler and a respective multiplexer, the data sampler having a data input and a clock input, the data input configured to receive input data from a respective one of a plurality of channels, the clock input configured to receive a clock signal from the respective multiplexer, the input data including non-calibration data and calibration data;
  a first phase adjustor configured to provide a first clock signal to the multiplexer of the plurality of data receivers for only the non-calibration data; and
  a second phase adjustor configured to provide a second clock signal to the multiplexer of the plurality of data receivers for only the calibration data;
  wherein responsive to a completion of a calibration process for at least a minimum number of the plurality of data receivers, the first phase adjustor is reconfigured to provide the first clock signal to the multiplexer of the plurality of data receivers for only the calibration data at any given time, and the second phase adjustor is reconfigured to provide the second clock signal to the multiplexer of the plurality of data receivers for only the non-calibration data at any given time.

20. The parallel input/output interface receiver of claim 19, wherein the calibration process is performed to allow adjustment of a phase of the second clock signal while preventing adjustment of a phase of the first clock signal.

21. The parallel input/output interface receiver of claim 19, wherein responsive to a given one of the plurality of channels being taken off line to be a current channel under a calibration process, the multiplexer of a corresponding one of the plurality of data receivers switches the clock signal from the first clock signal to the second clock signal, and
  wherein responsive to the calibration process for the current channel being complete, the multiplexer of the corresponding one of the plurality of data receivers switches the clock signal back from the second clock signal to the first clock signal.

22. A method for timing recovery in a parallel input/output interface receiver, comprising:
  receiving input data from a respective one of a plurality of channels by a respective data sampler included in each of a plurality of data receivers, each of the plurality of data receivers further including a respective multiplexer for providing a clock signal to the respective data sampler, the input data including non-calibration data and calibration data;
  configuring a first phase adjustor to provide a first clock signal to the multiplexer of the plurality of data receivers for only the non-calibration data;
  configuring a second phase adjustor to provide a second clock signal to the multiplexer of the plurality of data receivers for only the calibration data; and
  responsive to a completion of a calibration process for at least a minimum number of the plurality of data receivers, reconfiguring the first phase adjustor to provide the first clock signal to the multiplexer of the plurality of data receivers for only the calibration data at any given time, and reconfiguring the second phase adjustor to provide the second clock signal to the multiplexer of the plurality of data receivers for only the non-calibration data at any given time.

23. The method of claim 22, wherein the calibration process is performed to allow adjustment of a phase of the second clock signal while preventing adjustment of a phase of the first clock signal.

* * * * *